(12) United States Patent
Aines et al.

(10) Patent No.: US 10,183,251 B2
(45) Date of Patent: Jan. 22, 2019

(54) MICROCAPSULE FABRIC FOR ABSORPTION AND RELEASE

(71) Applicant: LAWRENCE LIVERMORE NATIONAL SECURITY, LLC, Livermore, CA (US)

(72) Inventors: Roger D. Aines, Livermore, CA (US); William L. Bourcier, Livermore, CA (US); Eric B. Duoss, Dublin, CA (US); Joshuah K. Stolaroff, Oakland, CA (US); John J. Vericella, Champaign, IL (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 146 days.

(21) Appl. No.: 15/468,325

(22) Filed: Mar. 24, 2017

(65) Prior Publication Data

US 2018/0272273 A1   Sep. 27, 2018

(51) Int. Cl.
| | | |
|---|---|---|
| *B01D 53/02* | (2006.01) | |
| *B01D 53/22* | (2006.01) | |
| *B01D 61/38* | (2006.01) | |
| *D06M 15/00* | (2006.01) | |
| *B01J 20/28* | (2006.01) | |

(52) U.S. Cl.
CPC .......... *B01D 53/228* (2013.01); *B01D 61/38* (2013.01); *B01J 20/28033* (2013.01); *D06M 15/00* (2013.01)

(58) Field of Classification Search
CPC .. B01D 53/228; B01D 61/38; B01J 20/28033; D06M 15/00
See application file for complete search history.

(56) References Cited

U.S. PATENT DOCUMENTS

| | | |
|---|---|---|
| 6,958,085 B1 | 10/2005 | Parrish |
| 8,394,350 B2 | 3/2013 | Aines |
| 8,834,605 B2 | 9/2014 | Aines et al. |
| 8,945,279 B2 * | 2/2015 | Aines ..................... B01D 53/14 95/139 |
| 10,029,206 B2 * | 7/2018 | Aines ................. B01D 53/1425 |
| 2013/0109074 A1 * | 5/2013 | Aines ..................... B01D 53/14 435/188 |

* cited by examiner

*Primary Examiner* — Christopher P Jones
(74) *Attorney, Agent, or Firm* — Eddie E. Scott

(57) ABSTRACT

A permeable microcapsule embedded fabric acts as a sorbent that creates mold-able, variable geometry fabrics for static or dynamic use. The fabric is composed of micro encapsulated solvent spheres held together by structural members. The fabric provides an excellent means to absorb and separate gases and/or liquids, particularly to separate carbon dioxide from flue gases.

22 Claims, 11 Drawing Sheets

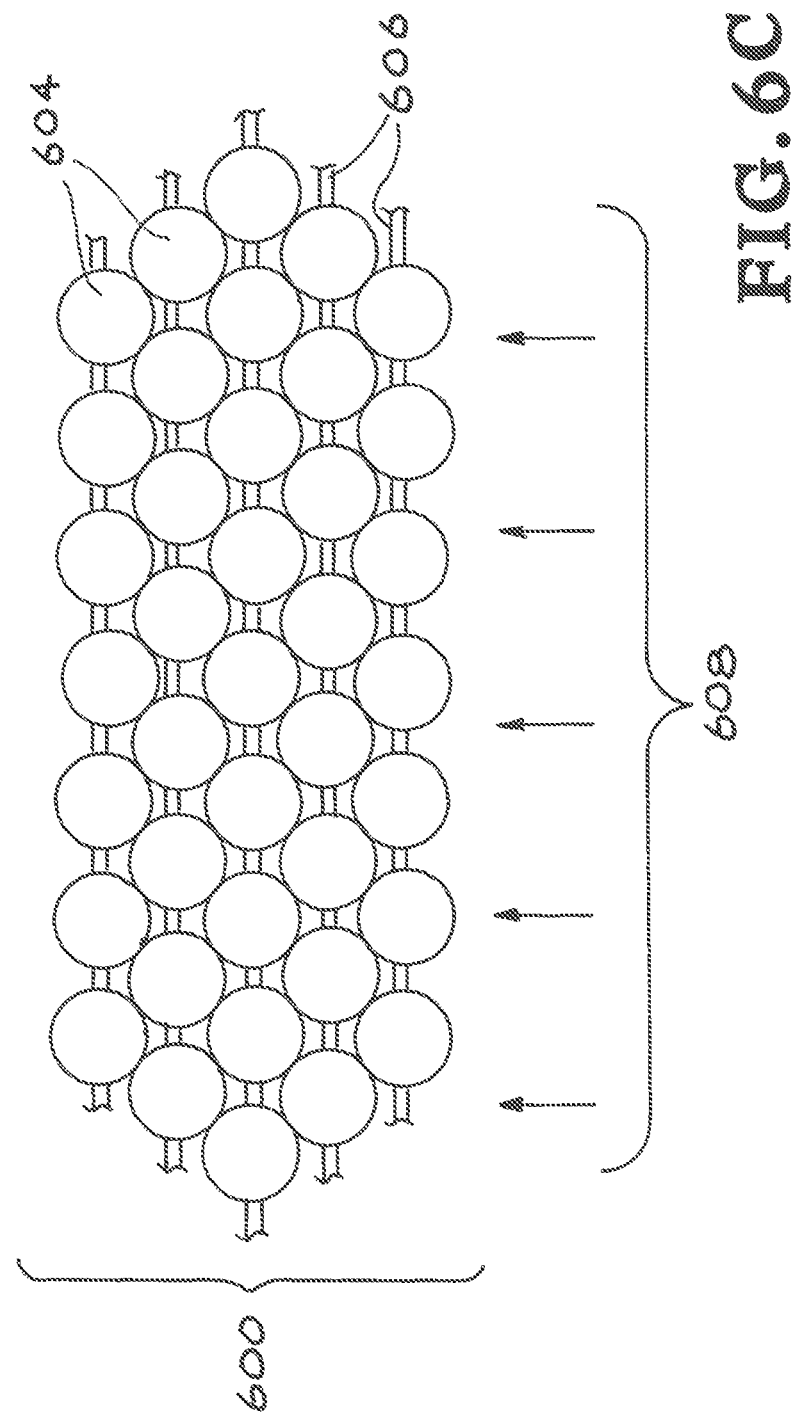

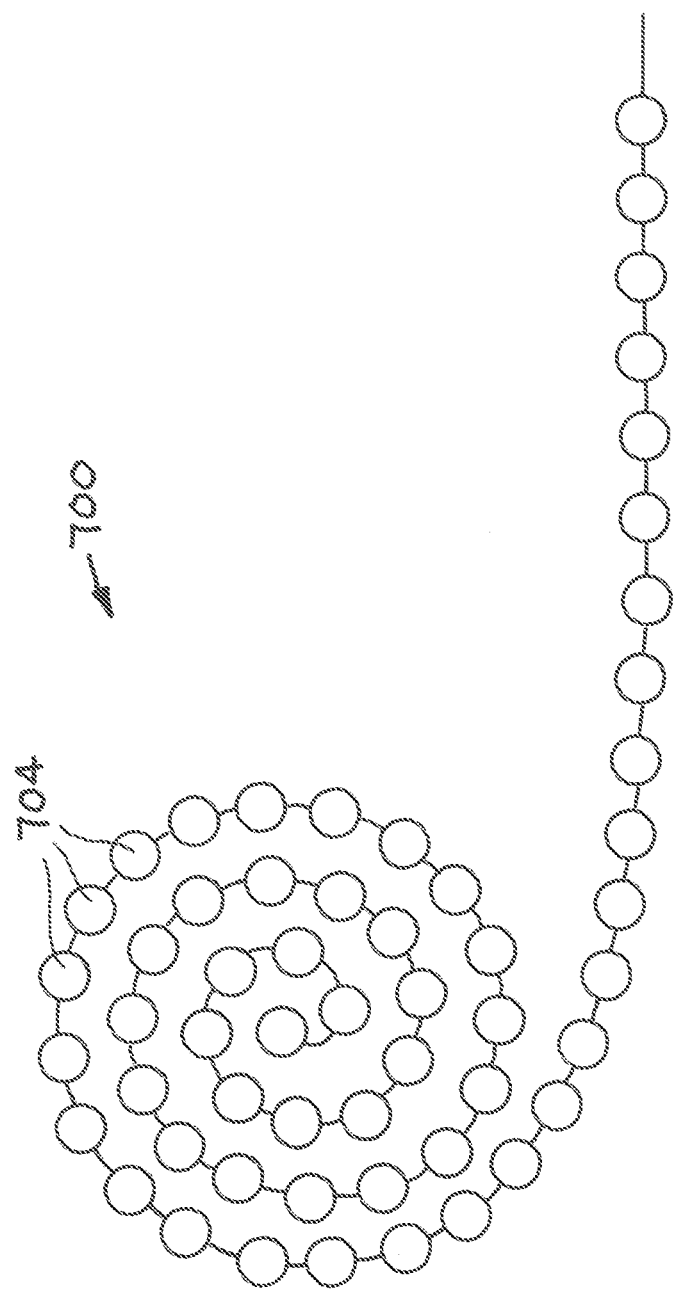

MICROCAPSULE FABRIC FOR ABSORPTION AND RELEASE

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to the absorption and release of carbon dioxide and/or other gases and liquids and more particularly to a permeable microcapsule embedded fabric that acts as a sorbent.

State of Technology

This section provides background information related to the present disclosure which is not necessarily prior art.

States Published Patent Application No. 2007/0169625 by Roger D. Aines and William L. Bourcier (now U.S. Pat. No. 8,394,350) for a carbon ion pump for removal of carbon dioxide from combustion gas and other gas mixtures provides the state of technology information that is reproduced below.

Carbon dioxide makes up from 5% (modern gas-fired plants) to 19% (modern coal plants) of the flue gas from a power plant. The remainder is mostly nitrogen, unused oxygen, and oxides of nitrogen and sulfur (which are strong greenhouse gases in addition to contributing to poor quality). A major limitation to reducing greenhouse gases in the atmosphere is the expense of stripping carbon dioxide from other combustion gases. Without a cost-effective means of accomplishing this, the world's hydrocarbon resources, if used, will continue to contribute carbon dioxide to the atmosphere. The disclosure of United States Published Patent Application No. 2007/0169625 (now U.S. Pat. No. 8,394,350) is incorporated herein in its entirety for all purposes.

U.S. Pat. No. 6,958,085 to Clyde F. Parrish issued Oct. 25, 2005 for a high performance immobilized liquid membrane for carbon dioxide separations provides the state of technology information that is reproduced below.

One embodiment of the present invention provides an immobilized liquid membrane that has a substrate. A plurality of capsules is disposed on the substrate. Each of the capsules is permeable to a first gas of a mixture of gasses comprising the first gas and a second gas. Each of the capsules is substantially impermeable to the second gas. A liquid is disposed in each of the capsules that is permeable to the first gas and substantially impermeable to the second gas.

Another embodiment of the present invention provides a method for manufacturing an immobilized liquid membrane. The method includes encapsulating a liquid in each of a plurality of capsules. Each of the capsules and the liquid are permeable to a first gas of a mixture of gasses comprising the first gas and a second gas. Each of the capsules and the liquid are substantially impermeable to the second gas. Disposing the liquid-containing capsules on a porous substrate and permeating the porous substrate and the liquid-containing capsules with a monomer are included in the method. The method further includes polymerizing the monomer to chemically bond the capsules to each other and the porous substrate.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide a permeable microcapsule embedded fabric that acts as a sorbent that creates mold-able, variable geometry fabrics for static or dynamic use. The fabric is composed of micro encapsulated solvent spheres held together by structural members. The inventor's apparatus, systems, and methods provide an excellent means to absorb and separate gases and/or liquids, and have been particularly developed to separate carbon dioxide from flue gases.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 6A-6C is an illustration of another system for making the solid media system.

FIGS. 7A-7B are illustrations of yet additional systems for making the solid media system.

DETAILED DESCRIPTION OF SPECIFIC EMBODIMENTS

Figure 1:
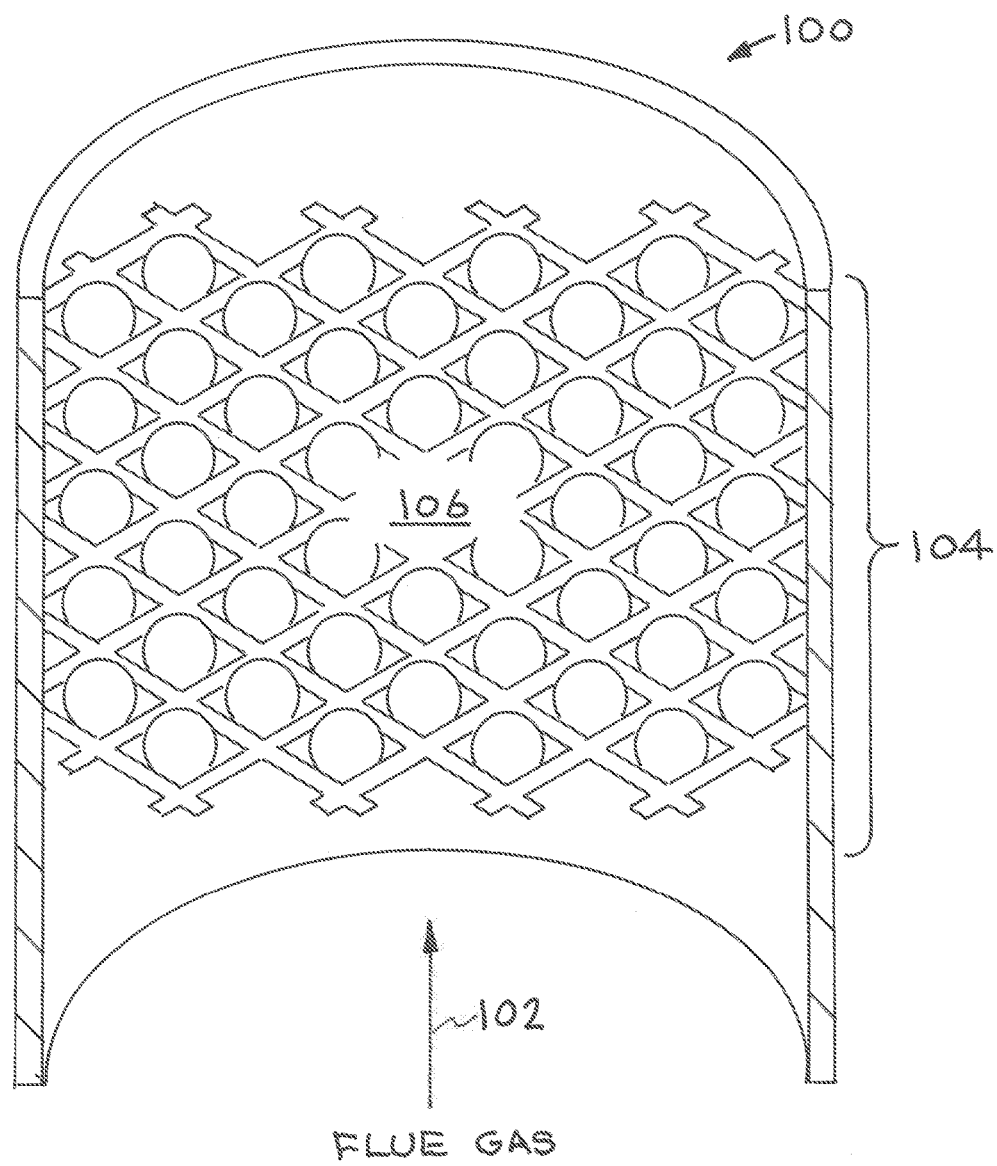
FIG. 1 illustrates one embodiment of the inventors' system for carbon dioxide removal.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

A current drawback for the application of microcapsules to treatment of gases is the lack of a robust operational concept. Fluidized beds are being evaluated, but are limited by the very low weight of the capsules (they fly to far) and the knowledge that abrasion will limit capsule lifetimes. A fixed-bed application was originally rejected because there is too little space for gas to pass between the capsules when they car close packed, leading to unacceptable back pressure.

One way to create a fixed bed without high back pressure is to create structures within the bed to pass gas more freely. The challenge there is to keep good gas contact with the media in the fixed bed, usually pelletized in some form. These channel structures lead to poor utilization of the bed volume as the channels tend to be large compared to the pellets, and therefore are far away from many of the pellets.

Referring now to the drawings, and in particular to FIG. 1, one embodiment of the inventors' system for carbon dioxide removal is illustrated. This embodiment is designated generally by the reference numeral 100. As illustrated in FIG. 1, flue gas 102 containing carbon dioxide is directed through a fluidized bed 104. The fluidized bed 104 includes a solid media system 106 for carbon dioxide removal. Carbon dioxide is absorbed by passing the flue gas 102 from which the carbon dioxide is to be separated through the fluidized bed 104 and the solid media system 106. The removed carbon dioxide can be transported to an injection site for sequestration and long-term storage in any of a variety of suitable geologic formations. The solid media system 106 provides a three-dimensional media for absorbing the carbon dioxide in the flue gas 102 as the flue gas 102 passes through the fluidized bed 104 and the solid media system 106. The solid media system 106 will be described in greater detail in the following descriptions and drawing illustrations.

Figure 2A:
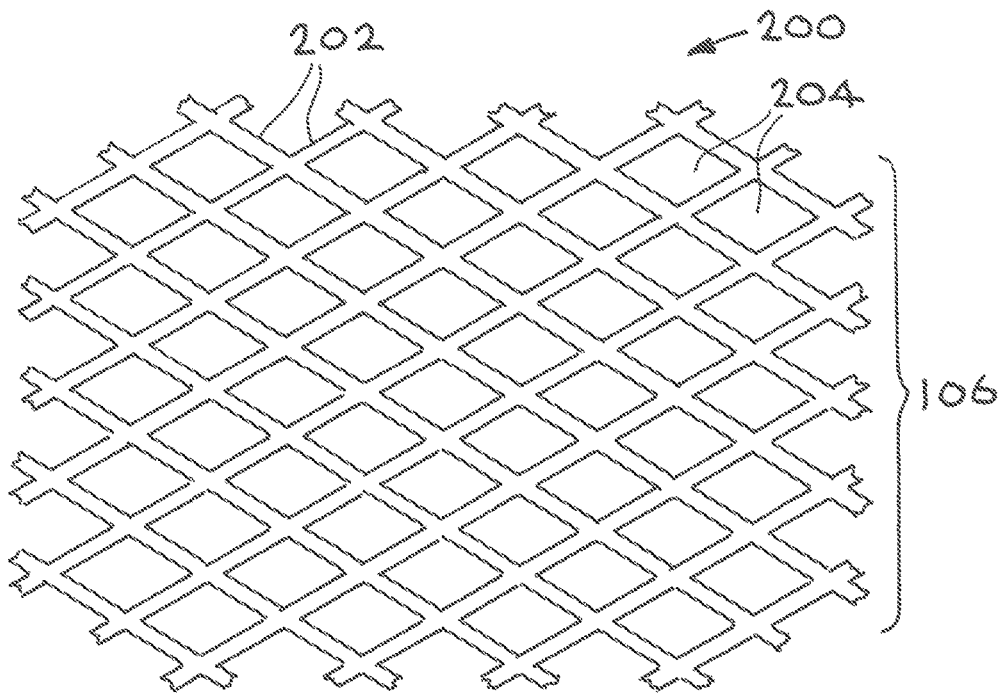
FIGS. 2A and 2B illustrate the solid media system of FIG. 1 in greater detail.
Figure 2B:
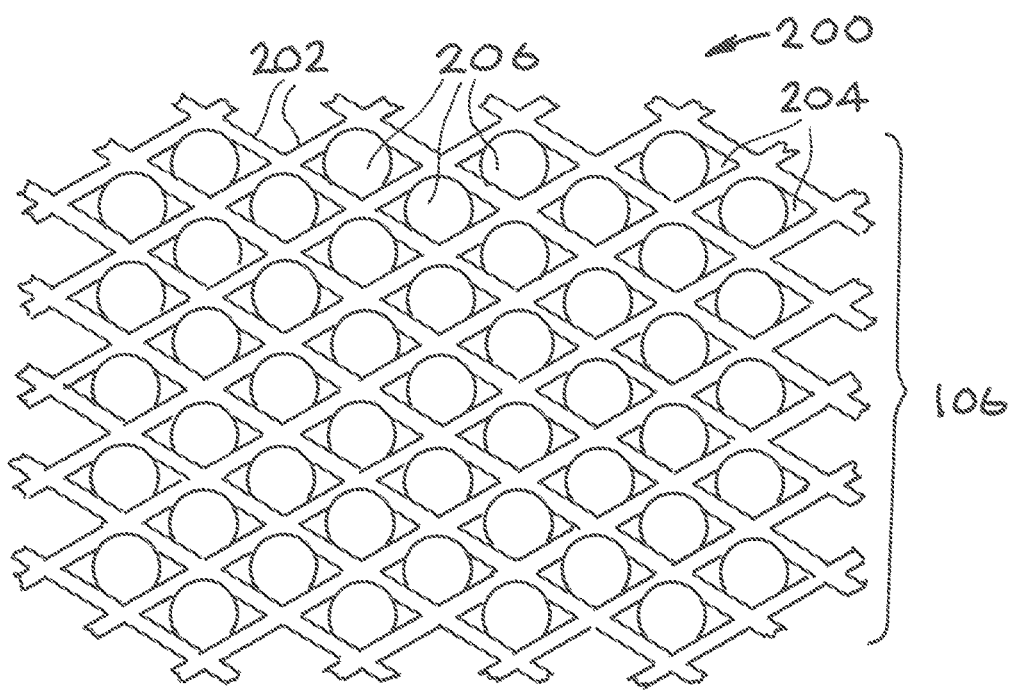

Referring now to FIGS. 2A and 2B, the solid media system 106 is illustrated in greater detail. The matrix 200 for the solid media system 106 is shown in FIG. 2A. The matrix 200 includes a web of support material 202 with openings 204 in the web.

FIG. 2B shows the solid media system 106 having the matrix 200 with the web of support material 202 and openings 204 in the web. Individual spheres 206 are retained in the openings 204 in the web. The individual spheres 206 are capsules with stripping solvents for absorbing the flue gas encapsulated within the capsules. The capsules have a polymer surface layer that is permeable to carbon dioxide. The solid media system 106 provides a three-dimensional media for absorbing carbon dioxide from the flue gas 102 as the flue gas 102 passes through the fluidized bed and the solid media system 106. The flue gas 102 containing the carbon dioxide passes through the openings 204 in the web and the carbon dioxide is absorbed by the stripping solvents in the spheres. The carbon dioxide that pass through the polymer surface layer of the spheres 206 and is absorbed by the stripping solvents inside the spheres.

Figure 3:
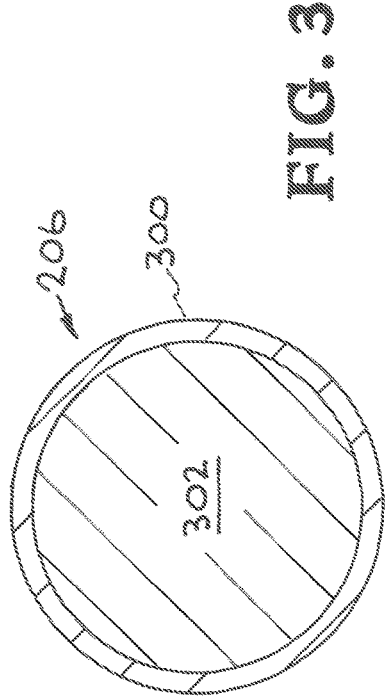
FIG. 3 illustrates the spheres for carbon dioxide removal in greater detail.

Referring now to FIG. 3, the spheres 206 are illustrated in greater detail. The individual spheres 206 have a polymer surface layer 300 that is permeable to carbon dioxide. Stripping solvents 302 for absorbing carbon dioxide are encapsulated within the spheres 206.

Figure 4:
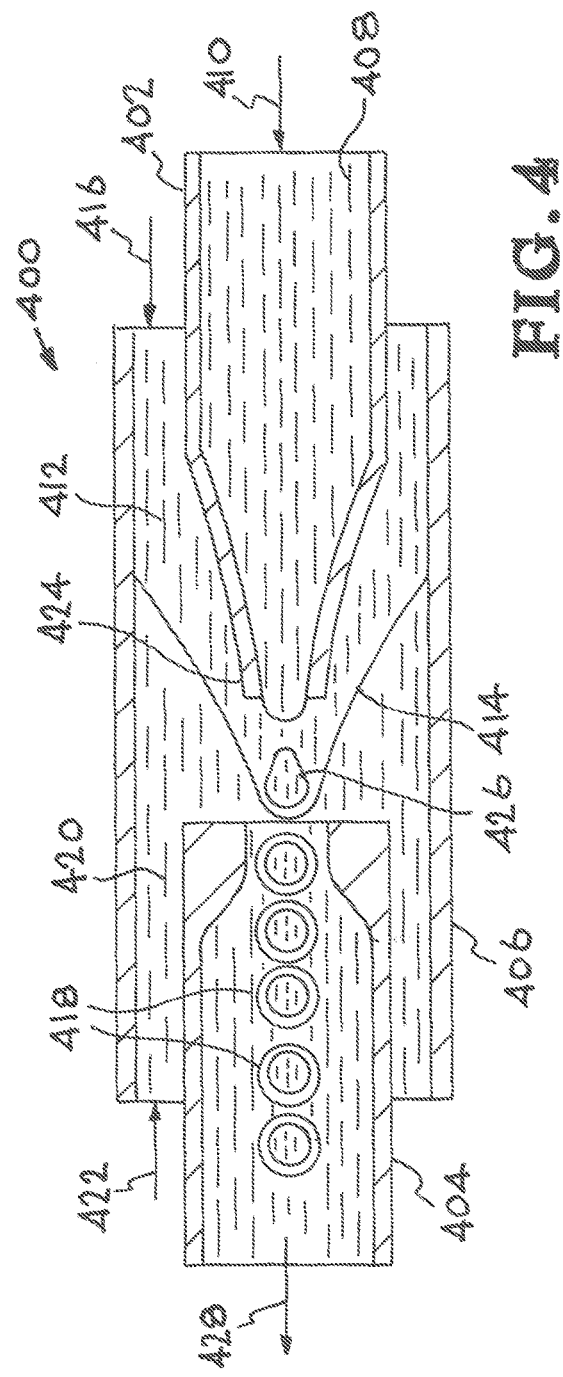
FIG. 4 is an illustration of a system for making the spheres.

Referring now to FIG. 4, a system for making the spheres is illustrated. The system for making the spheres is designated generally by the reference numeral 400. The individual spheres have a polymer surface layer that is permeable to carbon dioxide and have stripping solvents for absorbing carbon dioxide encapsulated within the polymer surface layer and inside the spheres. The system for making the spheres shown in FIG. 4 illustrates a system and method of fabricating double-emulsion microcapsules. The schematically illustrated method 400 is composed of the following items. An injection tube 402 with a ID (um) and OD 1000 (um), a collection tube 404 with an ID of 500 (um) and OD 1000 (um) and an outer tube 406 of square cross section with ID of 1000 (um) and ID of 1200 (um).

In operation the inner fluid 410 (MEA/H2O) with a viscosity of 10-50 (cP) and a flow rate of 200-800 (Ulh-1) flows in the injection tube 402 in the direction indicated by the inner fluid arrow. As this fluid proceeds it passes thru a droplet forming nozzle 424. The formed droplet 426 is released from the nozzle 402 and becomes encased in the middle fluid 412 (NOA Pre-polymer) with a viscosity of 10-50 (cP) and flow rate of 200-800 (uLh-1), the middle fluid 412 is flowing in the direction indicated by arrow 416. The inner fluid droplet 426 becomes encased in the middle fluid 412 forming encapsulated microcapsules 418 that have a $CO_2$ capturing solvent core with a thin $CO_2$ permeable outer shell. The outer fluid (PVA Stabilizer) with a viscosity of 10-50 (cP) and a flow rate of 200-800 (uLh-1) flowing in the outer tube 406 in the direction indicated by arrow 422. This outer fluid 420 carries the fabricated microcapsules 418 into the collection tube 404. There is a boundary layer 414 that prevents the middle fluid 412 and outer fluid 420 from mixing as they have a large difference in both their viscosity and flow rates. The above described method will produce Microcapsules of a controlled size with an inner fluid (solvent/catalyst) enclosed in a $CO_2$ permeable polymer shell. The fabricated microcapsules 418 move out of the system as indicated by arrow 428.

Systems for producing microcapsules are described in U.S. Pat. No. 7,776,927 and in U.S. Published Patent Application Nos. 2009/0012187 and 2009/0131543. U.S. Pat. No. 7,776,927 to Liang-Yin Chu et al, assigned to the President and Fellows of Harvard College, discloses emulsions and the production of emulsions, including multiple emulsions and microfluidic systems for producing multiple emulsions. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0012187 to Liang-Yin Chu et al, assigned to the President and Fellows of Harvard College, discloses multiple emulsions, and to methods and apparatuses for making emulsions, and techniques for using the same. A multiple emulsion generally describes larger droplets that contain one or more smaller droplets therein which, in some cases, can contain even smaller droplets therein, etc. Emulsions, including multiple emulsions, can be formed in certain embodiments with generally precise repeatability, and can be tailored to include any number of inner droplets, in any desired nesting arrangement, within a single outer droplet. In addition, in some aspects of the invention, one or more droplets may be controllably released from a surrounding droplet. U.S. Published Patent Application No. 2009/0131543 to David A. Weitz discloses multiple emulsions, and to methods and apparatuses for making multiple emulsions. A multiple emulsion, as used herein, describes larger droplets that contain one or more smaller droplets therein. The larger droplet or droplets may be suspended in a third fluid in some cases. In certain embodiments, emulsion degrees of nesting within the multiple emulsion are possible. For example, an emulsion may contain droplets containing smaller droplets therein, where at least some of the smaller droplets contain even smaller droplets therein, etc. Multiple emulsions can be useful for encapsulating species such as pharmaceutical agents, cells, chemicals, or the like. In some cases, one or more of the droplets (e.g., an inner droplet and/or an outer droplet) can change form, for instance, to become solidified to form a microcapsule, a liposome, a polymerosome, or a colloidosome. As described below, multiple emulsions can be formed in one step in certain embodiments, with generally precise repeatability, and can be tailored to include one, two, three, or more inner droplets within a single outer droplet (which droplets may all be nested in some cases). As used herein, the term "fluid" generally means a material in a liquid or gaseous state. Fluids, however, may also contain solids, such as suspended or colloidal particles. U.S. Pat. No. 7,776,927 and U.S. Published Patent Application Nos. 2009/0012187 and 2009/0131543 are incorporated herein by this reference.

Figure 5:
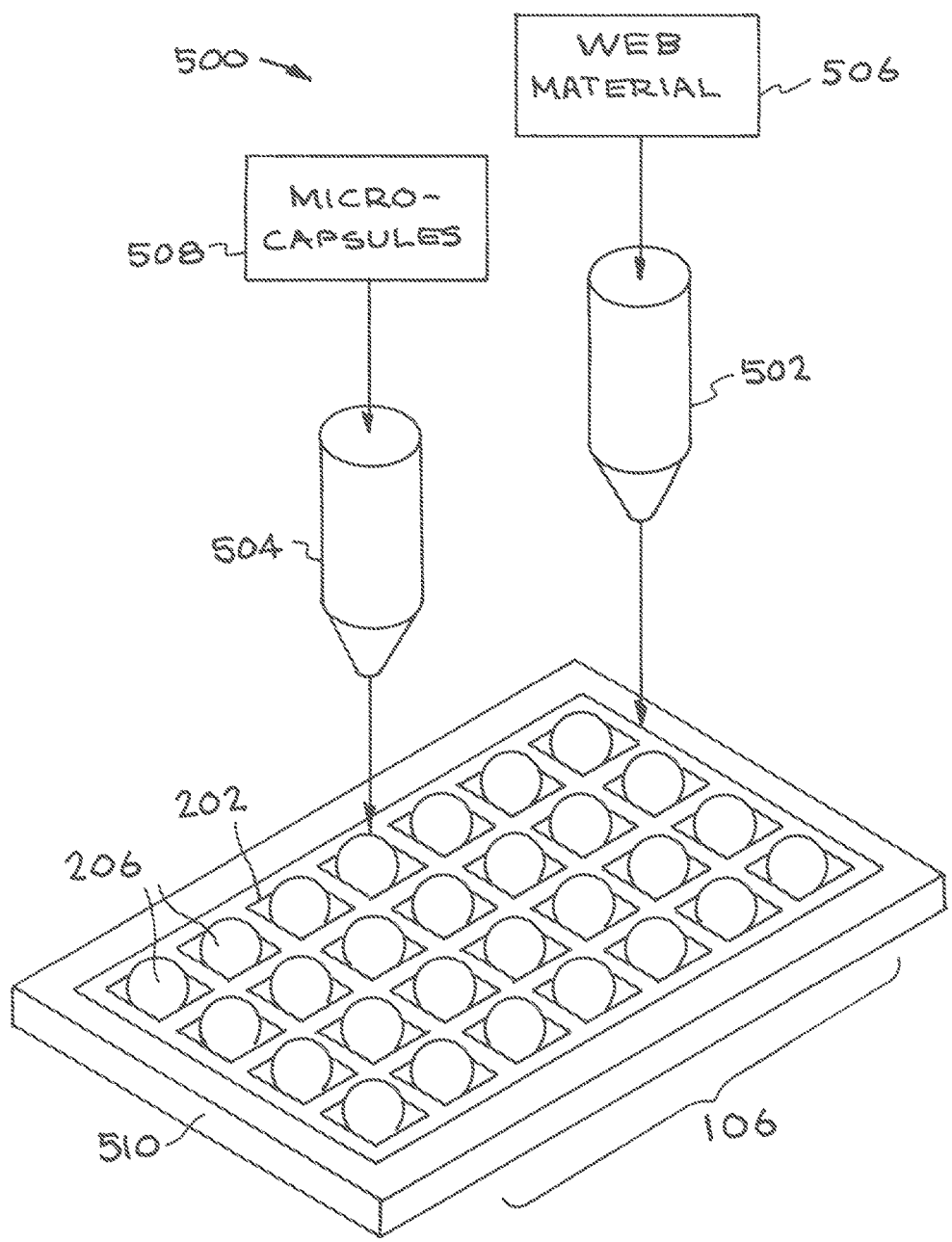
FIG. 5 is an illustration of an additive manufacturing system for making the solid media system of FIG. 1.

Referring now to FIG. 5, an additive manufacturing system for making the solid media system of FIG. 1 is illustrated. The additive manufacturing system is designated generally by the reference numeral 500. The additive manufacturing system 500 produces the solid media system 106.

The additive manufacturing system 500 uses state of the art 3-D printing technology to produce the solid media system 106. Initially, a three-dimensional model of the solid media system 106 is produced in a computer readable format. The model is used by the additive manufacturing system 500 to control the components of the 3-D printing system. The additive manufacturing system 500 uses two head disposition printing to build the solid media system 106 on a substrate 510. The system 500 uses one head 502 for depositing a web of support material 202 and the other head 504 for depositing the spheres 206 in the web.

As illustrated in FIG. 5, one of the print heads 502 obtains web material from a web material supply source 506. The print head 502 uses the web material to print the web of support material 202. The other of the print head 504 obtains microcapsule spheres 206 from a microcapsule sphere supply source 508. The print head 504 deposits the spheres 206 in the web 202. The solid media system 106 is printed one layer at a time wherein each layer includes a web of support material 202 and the spheres 206 in the web.

Figure 6A:
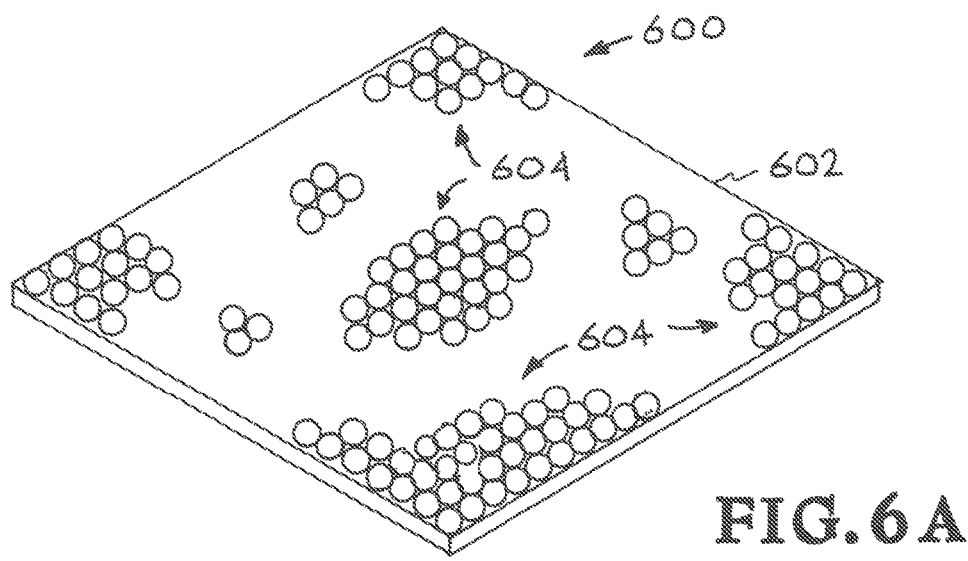
Figure 6B:
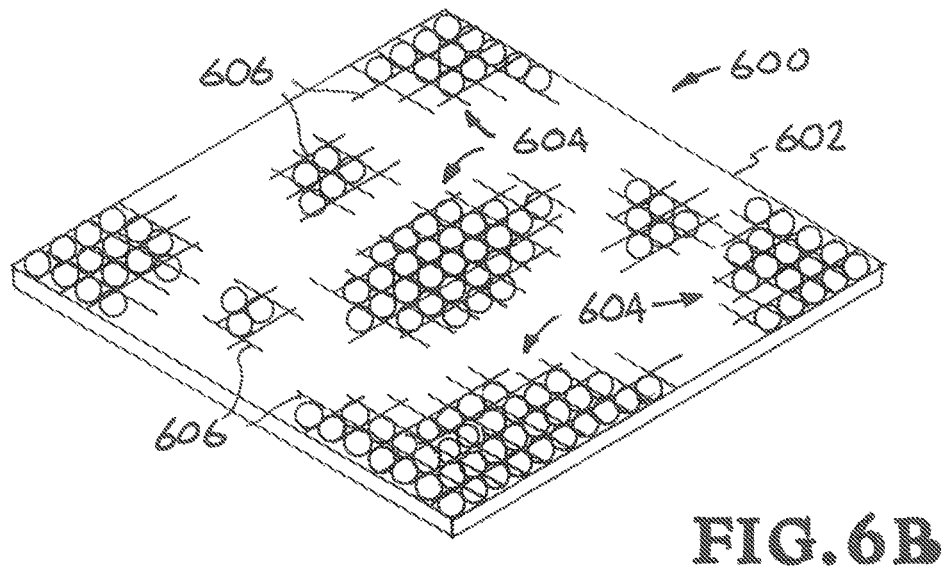

Referring now to FIGS. 6A, 6B, and 6C, illustrates additional systems for making the solid media system. The additional systems for making the solid media system provide a fabric that is used as a solid media system in a fixed bed for removing carbon dioxide from other gases.

Referring to FIG. 6A one of the additional systems for making the solid media system is illustrated. The additional systems for making the solid media system are designated generally by the reference numeral 600. As illustrated in FIG. 6A a sheet 602 holding spheres 604 is prepared. The spheres 604 are laid out on the sheet 602. The sheet 602 is a membrane that is permeable to both gases and liquids. The spheres and the sheet are held together by direct welding of the spheres to each other and by direct welding of the spheres 604 to the sheet 602. Alternatively, other means can be used to connect the capsules 604 in the 2-D sheet 602. The capsules 604 can be formed onto the 2-D sheet 602 before being fully cured. Final curing of will weld the capsules 604 together and to the sheet 602. Alternatively, polymer material can be added over the 2-D sheet 602 and the spheres 604 as a spider web.

The two-dimensional sheet 602 of spheres 604 is then be formed into a three-dimensional fabric. Additional layers of spheres 604 are stacked on the first layer and the additional spheres connected to the first layer. Subsequent layers are added forming the three-dimensional fabric. The three-dimensional fabric is used as the solid media in a fixed bed for removing carbon dioxide from other gases.

Referring now to FIG. 6B, another embodiment of the additional system 600 for forming the solid media system is illustrated. As shown in FIG. 6B spheres 604 are laid out on the sheet 602. Support material 606 is added. This may be accomplished by adding fibers, tubes, or other structural members 606 to hold the spheres 604 in place. Additional layers of spheres 604 and structural members 606 are stacked on the first layer and the additional layers of spheres 604 and structural members 606 are connected to the first layer and subsequent layers forming a three-dimensional fabric. The three-dimensional fabric is used as a solid media system in a fixed bed for removing carbon dioxide from other gases.

Referring now to FIG. 6C, another embodiment of the additional system 600 for forming the solid media system is illustrated. As shown in FIG. 6C spheres 604 a bottom layer of spheres 604 and support material 606 is formed. The support material 606 can be tubes or other structural members to hold the spheres 604 in place. Additional layers of spheres 604 and structural members 606 are stacked on the first layer and the additional layers of spheres 604 and structural members 606 are connected to the first layer and subsequent layers forming a three-dimensional fabric. The flue gas 608 from which the carbon dioxide is to be separated is directed through the three-dimensional fabric for absorbing carbon dioxide from the flue gas 608 as the flue gas passes through the solid media system 600. The three-dimensional fabric is used as a solid media system in a fixed bed for removing carbon dioxide from other gases.

Figure 7B:
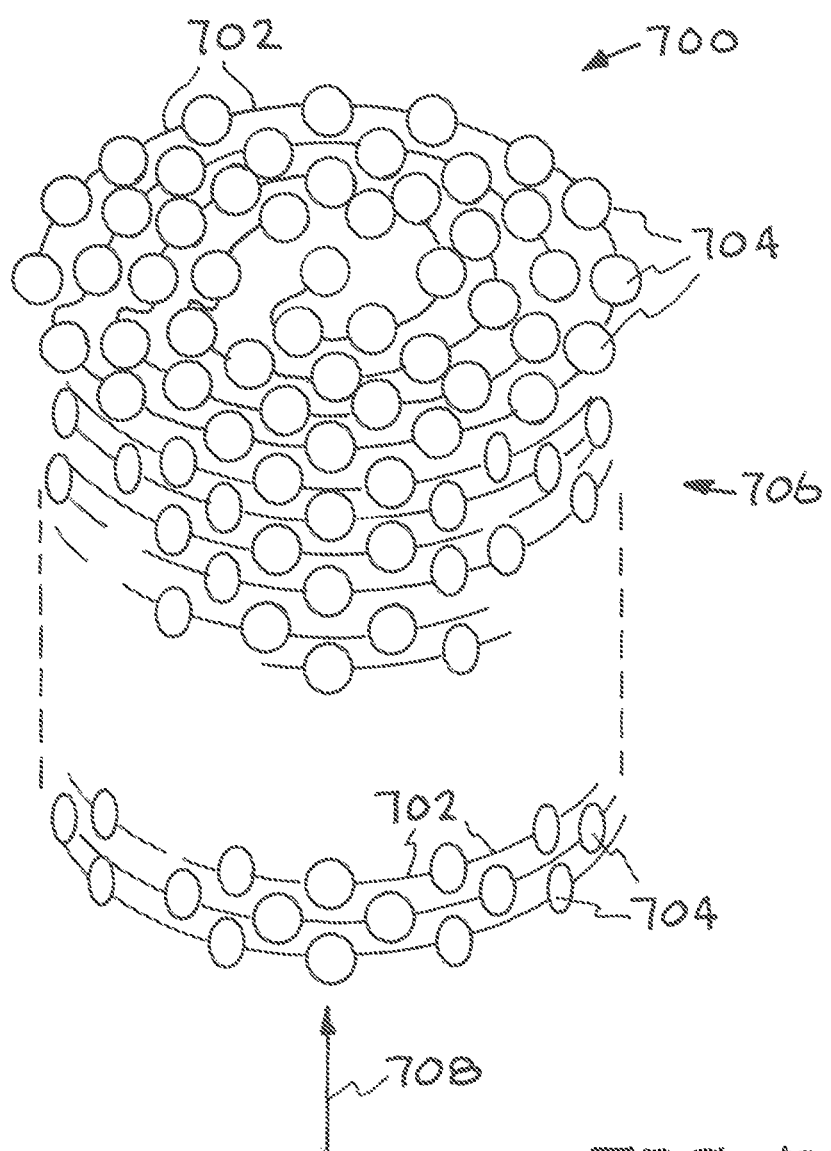

Referring now to FIGS. 7A and 7B, another embodiment of the solid media system is illustrated. This additional embodiment is designated generally by the reference numeral 700. FIG. 7A illustrates the first steps in producing the solid media system 700. In the first step a 2-D sheet 702 with spheres 704 is prepared. The spheres 704 are laid out on the sheet 702 so that they attach to the sheet 702. In the next step the sheet 702 is rolled to encase the spheres 704.

FIG. 7B shows the rolled sheet 702 with spheres 704 forming a cylinder 706. The spheres 704 are retained in cylinder 706. The individual spheres 704 are capsules with stripping solvents for absorbing the flue gas encapsulated within the capsules. The capsules have a polymer surface layer that is permeable to carbon dioxide. The solid media system 700 provides a system for absorbing carbon dioxide from a flue gas. The flue gas 708 is directed to the cylinder 706. The flue gas 708 containing the carbon dioxide passes through the cylinder 706 and the carbon dioxide is absorbed by the stripping solvents that pass through the polymer surface layer of the spheres 704.

Figure 8A:
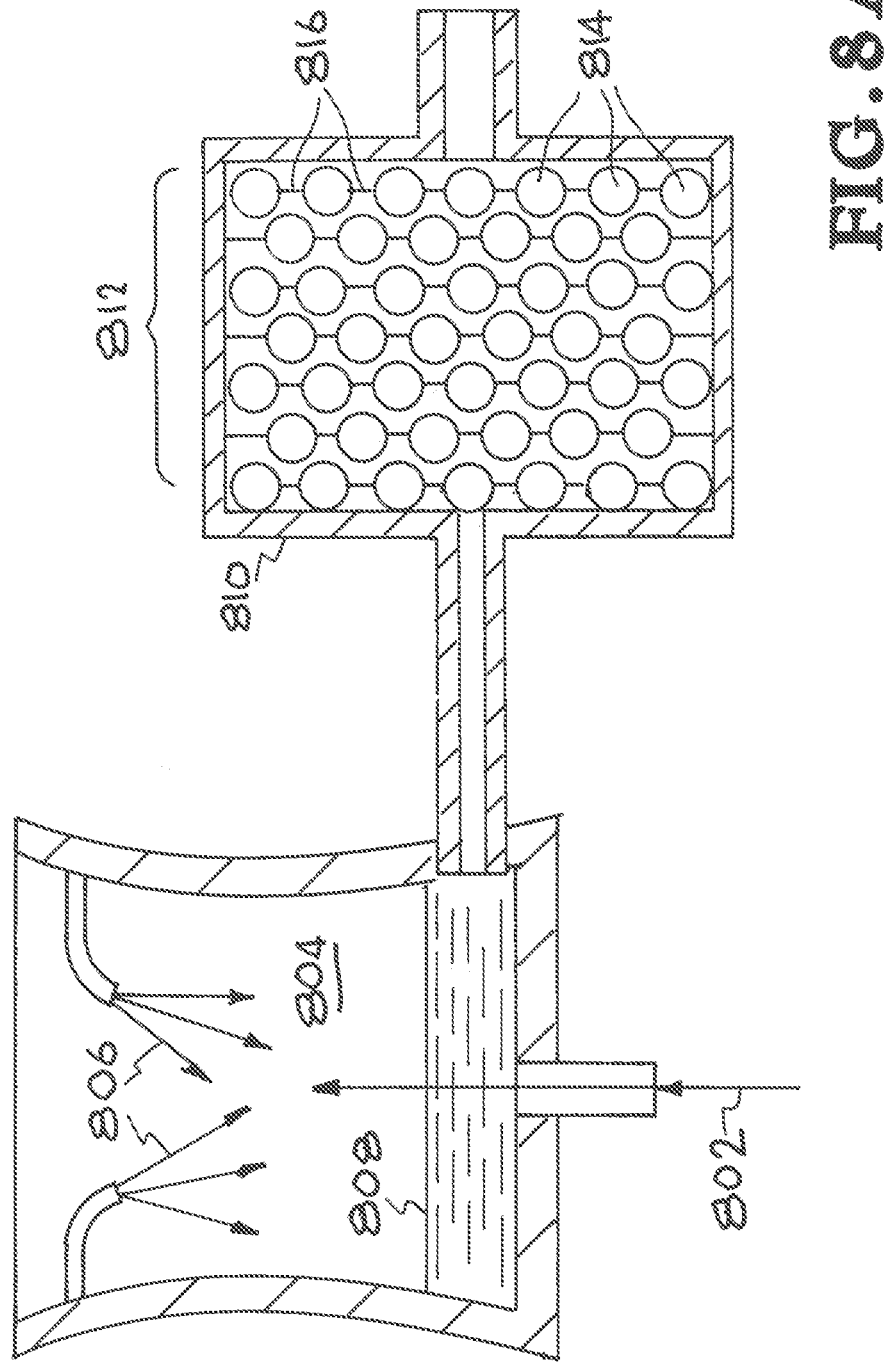
FIGS. 8A-8B illustrate additional embodiments of the inventors' system for carbon dioxide removal.
Figure 8B:
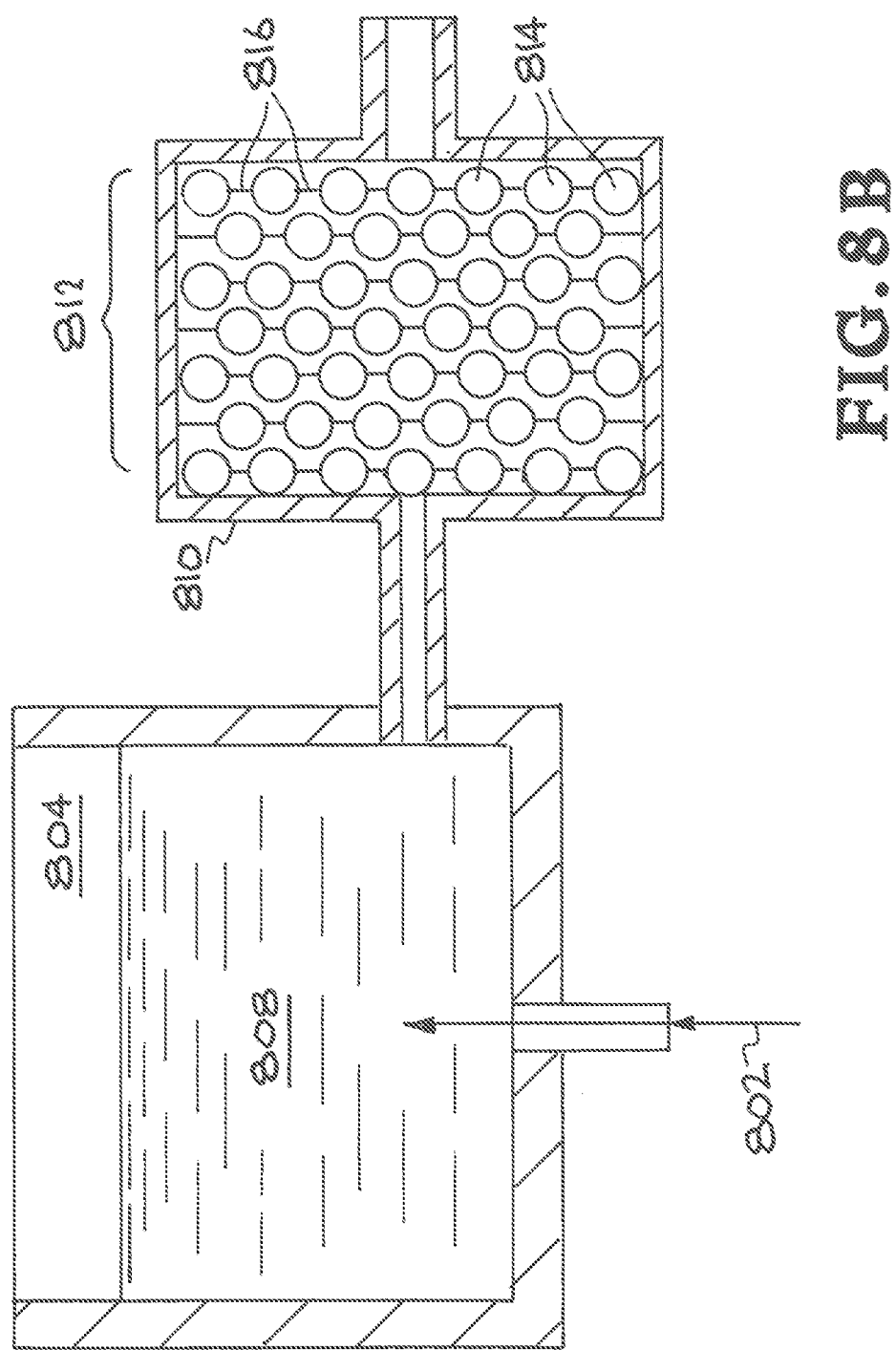

Referring now to FIGS. 8A and 8B, another embodiment of the solid media system is illustrated. FIG. 8A is an illustration showing flue gas containing carbon dioxide 802 directed through water 808 wherein the water 808 absorbs the carbon dioxide. Water is introduced into a containment vessel 804 by sprays 806. The carbon dioxide is absorbed by the water 808. The water 808 containing the carbon dioxide is processed to remove the carbon dioxide in the water 808. The water 808 is directed through a vessel 810 wherein a solid media system 812 removes the carbon dioxide from the water 808. The solid media system 810 includes individual spheres 814 in a web 816. The individual spheres 814 are capsules with stripping solvents for absorbing the carbon dioxide encapsulated within the capsules. The capsules have a polymer surface layer that is permeable to carbon dioxide.

Referring now to FIG. 8B an illustration shows flue gas containing carbon dioxide 802 bubbled through water 808 wherein the water 808 absorbs the carbon dioxide. The water 808 containing the carbon dioxide is processed to remove the carbon dioxide in the water 808. The water 808 is directed through a vessel 810 wherein a solid media system 812 removes the carbon dioxide from the water 808. The solid media system 810 includes individual spheres 814 in a web 816. The individual spheres 814 are capsules with stripping solvents for absorbing the carbon dioxide encapsulated within the capsules. The capsules have a polymer surface layer that is permeable to carbon dioxide.

Figure 9:
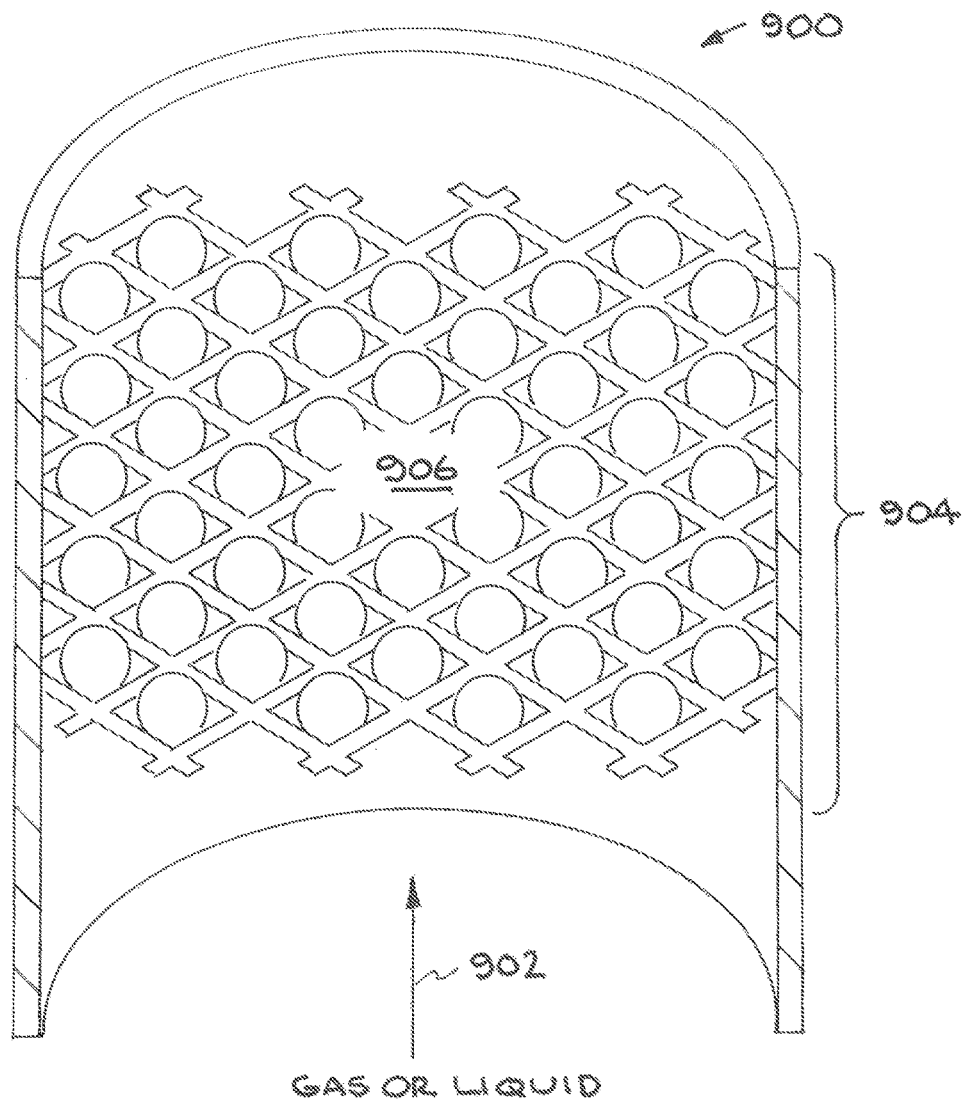
FIG. 9 illustrates another embodiment of the inventors' system for removal of gases and/or liquids.

Referring now to FIG. 9, another embodiment of the inventors' system for gas and/or liquid removal is illustrated. This embodiment is designated generally by the reference numeral 900. As illustrated in FIG. 9, a gas or liquid 902 containing a gas or liquid to be removed is directed through a fluidized bed 904. The fluidized bed 904 includes a solid media system 906 for removal of the particular gas or liquid from the gas or liquid 902. The removed gas or liquid can be transported to another site for further handling. The solid media system 906 provides a three-dimensional media for absorbing the particular gas or liquid to be removed as it passes through the fluidized bed 904 and the solid media system 906.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. A fabric for removing carbon dioxide from a gas containing the carbon dioxide, comprising:
    a web of support material;
    spherical capsules contained in said web;
    a polymer surface layer on said spherical capsules, wherein said polymer surface layer is permeable to carbon dioxide; and
    stripping solvents encapsulated within said polymer surface layer of said spherical capsules, wherein said polymer surface layer absorbs the carbon dioxide.

2. The fabric for removing carbon dioxide from a gas containing the carbon dioxide of claim 1 wherein said web of support material comprises the spherical capsules directly welded together.

3. The fabric for removing carbon dioxide from a gas containing the carbon dioxide of claim 1 wherein said web of support material comprises fibers.

4. The fabric for removing carbon dioxide from a gas containing the carbon dioxide of claim 1 wherein said web of support material comprises tubes.

5. The fabric for removing carbon dioxide from a gas containing the carbon dioxide of claim 1 wherein said web of support material comprises polymer material.

6. The fabric for removing carbon dioxide from a gas containing the carbon dioxide of claim 1 wherein said polymer surface layer is made of a porous solid.

7. The fabric for removing carbon dioxide from a gas containing the carbon dioxide of claim 1 wherein said polymer surface layer is made of polystyrene, polyethylene, polypropylene, silicones, or nylon.

8. The fabric for removing carbon dioxide from a gas containing the carbon dioxide of claim 1 wherein said stripping solvents are powder.

9. The fabric for removing carbon dioxide from a gas containing the carbon dioxide of claim 1 wherein said stripping solvents are liquid.

10. A method of making a fabric for removing carbon dioxide from a gas containing the carbon dioxide, comprising:
    providing spherical capsules;
    providing a polymer surface layer on said spherical capsules, wherein said polymer surface layer is permeable to carbon dioxide;
    providing stripping solvents encapsulated within said polymer surface layer of said spherical capsules, wherein said polymer surface layer absorbs the carbon dioxide; and
    connecting said spherical capsules with a web of support material to make the fabric.

11. The method of making a fabric for removing carbon dioxide from a gas containing the carbon dioxide of claim 10 wherein said step of connecting said spherical capsules with a web of support material comprises direct welding said spherical capsules to each other.

12. The method of making a fabric for removing carbon dioxide from a gas containing the carbon dioxide of claim 10 wherein said step of connecting said spherical capsules with a web of support material comprises adding a polymer material to said spherical capsules.

13. The method of making a fabric for removing carbon dioxide from a gas containing the carbon dioxide of claim 10 wherein said step of connecting said spherical capsules with a web of support material comprises adding fibers to said spherical capsules.

14. The method of making a fabric for removing carbon dioxide from a gas containing the carbon dioxide of claim 10 wherein said step of connecting said spherical capsules with a web of support material comprises adding tubes to said spherical capsules.

15. The method of making a fabric for removing carbon dioxide from a gas containing the carbon dioxide of claim 10 wherein said step of connecting said spherical capsules with a web of support material comprises three D printing said spherical capsules into a web of support material.

16. A method of removing carbon dioxide from a gas mixture containing the carbon dioxide, comprising the steps of:
    providing spherical capsules;
    providing a polymer surface layer on said spherical capsules, wherein said polymer surface layer is permeable to carbon dioxide;
    providing stripping solvents encapsulated within said polymer surface layer of said spherical capsules, wherein said polymer surface layer absorbs the carbon dioxide;
    connecting said spherical capsules with a web of support material to make the fabric; and
    directing the gas mixture containing the carbon dioxide through said fabric.

17. The method of removing carbon dioxide from a gas mixture containing the carbon dioxide of claim 16 wherein said step of connecting said spherical capsules with a web of support material to make the fabric comprises three D printing said spherical capsules into a web of support material.

18. The method of removing carbon dioxide from a gas mixture containing the carbon dioxide of claim 16 wherein said step of connecting said spherical capsules with a web of support material to make the fabric comprises welding said spherical capsules to each other.

19. The method of removing carbon dioxide from a gas mixture containing the carbon dioxide of claim 16 wherein said step of connecting said spherical capsules with a web of support material to make the fabric comprises adding fibers to said spherical capsules.

20. The method of removing carbon dioxide from a gas mixture containing the carbon dioxide of claim 16 wherein said step of connecting said spherical capsules with a web of support material to make the fabric comprises adding tubes to said spherical capsules.

21. A fabric for removing an identified gas or a liquid from a gas or liquid containing the identified gas or liquid, comprising:
    a web of support material;
    spherical capsules contained in said web;
    a polymer surface layer on said spherical capsules, wherein said polymer surface layer is permeable to the identified gas or the liquid; and
    stripping solvents encapsulated within said polymer surface layer of said spherical capsules, wherein said polymer surface layer absorbs the identified gas or liquid.

22. A method of removing an identified gas or a liquid from a gas or liquid containing the identified gas or liquid, comprising the steps of:
    providing spherical capsules;
    providing a polymer surface layer on said spherical capsules, wherein said polymer surface layer is permeable to the identified gas or liquid;
    providing stripping solvents encapsulated within said polymer surface layer of said spherical capsules, wherein said polymer surface layer absorbs the identified gas or liquid;
    connecting said spherical capsules with a web of support material to make the fabric; and
    directing the gas or liquid containing the identified gas or liquid through said fabric.

* * * * *